United States Patent
Lerch et al.

(10) Patent No.: US 12,389,227 B2
(45) Date of Patent: Aug. 12, 2025

(54) NFC ANTI-RELAY PROTECTION

(71) Applicant: Apple Inc., Cupertino, CA (US)

(72) Inventors: Matthias Lerch, San Francisco, CA (US); Florian Galdo, Emerald Hills, CA (US); Gordon Y. Scott, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 352 days.

(21) Appl. No.: 17/952,186

(22) Filed: Sep. 23, 2022

(65) Prior Publication Data

US 2023/0224709 A1 Jul. 13, 2023

Related U.S. Application Data

(60) Provisional application No. 63/248,349, filed on Sep. 24, 2021.

(51) Int. Cl.
*H04W 12/122* (2021.01)
*G07C 9/00* (2020.01)

(52) U.S. Cl.
CPC ...... *H04W 12/122* (2021.01); *G07C 9/00309* (2013.01); *G07C 2009/00555* (2013.01)

(58) Field of Classification Search
CPC ............................ H04W 12/122; H04W 12/61; G07C 9/00309; G07C 2009/00555
See application file for complete search history.

(56) References Cited

U.S. PATENT DOCUMENTS

2014/0365776 A1\* 12/2014 Smets .................. G06Q 20/401
713/171
2022/0067687 A1\* 3/2022 Hay ........................ G06N 20/00

FOREIGN PATENT DOCUMENTS

WO WO-2020120292 A1 \* 6/2020 ....... G02F 1/136204

\* cited by examiner

*Primary Examiner* — Siu M Lee
(74) *Attorney, Agent, or Firm* — Kilpatrick Townsend & Stockton LLP (57) ABSTRACT

Systems and methods for detecting and preventing a relay attack in a channel on which a near field communication (NFC) action between a key holder device and a reader is attempted are disclosed. A time limit is established for polling communications between the key holder device and the reader. Each of the reader and the key holder device generates a reader random value and a device random value respectively. The reader sends to the key holder device the reader random value, which includes the time limit for a response from the key holder device, the response including the device random value and the reader random value. The reader receives the response from the key holder device and can then determine whether the response from the key holder device is received within the time limit, to detect whether a relay attack can be made on the channel for the NFC action.

20 Claims, 9 Drawing Sheets

NFC ANTI-RELAY PROTECTION

CROSS-REFERENCES TO RELATED APPLICATIONS

This application claims priority to U.S. Provisional Patent Application No. 63/248,349, filed Sep. 24, 2021, entitled "NFC Anti-Relay Protection," which is herein incorporated by reference in its entirety and for all purposes.

BACKGROUND

Near-field communication (NFC) is a set of wireless communication protocols for communications between two devices within a short distance from each other. Typically, the distance is 4 cm or less. NFC usually takes place between an initiator that generates a radio frequency (RF) field, such as a reader or terminal, which can power a passive target, such as a card, key fob, tag, or other device. Note that "card" and "device" are used herein synonymously, as well as "reader" and "terminal."

However, NFC communications can be easily intercepted and relayed over long-distance networks or by specific equipment. This is particularly dangerous if the attacked card is in express mode (no user authentication and no user intent required for a transaction). It has been demonstrated on a commercial vehicle with an NFC car key following the Car Connectivity Consortium (CCC) standard, which standardizes device-to-car digital keys, where the car hosts the reader or terminal, and where a relay is possible to unlock the door and to start the engine with the device being far away from the vehicle. The relay attack introduces short delays of not more than a few milliseconds (e.g., 1 ms is possible) in the communication, especially if sophisticated equipment is used.

Normal NFC communication and command processing in the device generally takes between 5 and 200 ms per command, with some variations when executing the same command due to different software states, possible anti-defragmentation of the device (SE) flash memory, CLF to SE communication, and other reasons. Also, different cards and devices have different processing times for the same command. Because the added relay time is in a similar range as the time variation in processing of a command on the same device, countermeasures are not as simple as measuring changes in the response times to detect a relay attack.

Figure 1:
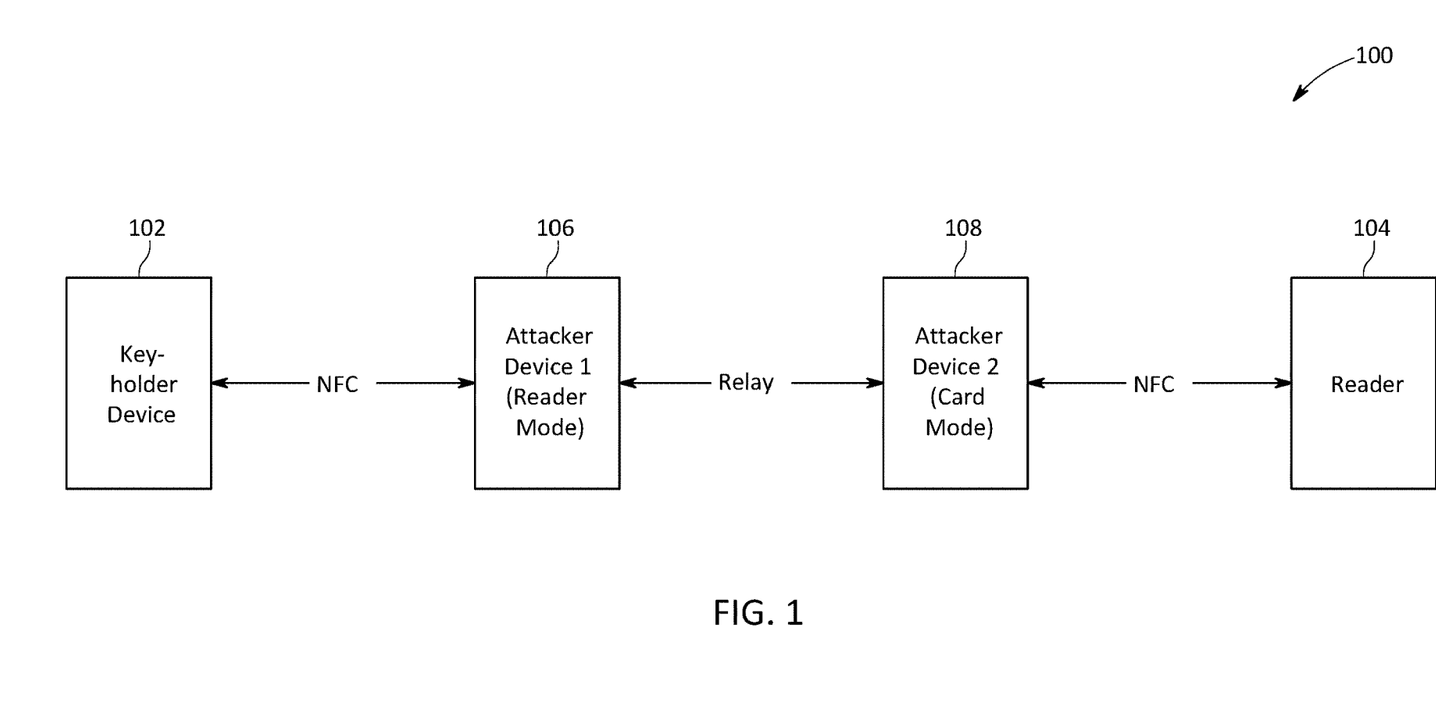
FIG. 1 illustrates an NFC system and where an attack can occur between a reader and a key holder device.

A relay attack between a key holder device 102 and a reader 104 can be executed as shown in FIG. 1. Attacker device 1 106 is in reader mode and transacts with a key holder device 102. They key holder device 102 is unaware of this transaction, or the key holder device is unattended. A pertinent part of the communication (i.e., not the NFC protocol establishment) is relayed to attacker device 2 108, which is presented to the reader 104 in a card emulation mode. An application command sent by the reader 104 is relayed via both attacker devices 106, 108 to the key holder device 102, and the response of the key holder device 102 is relayed back to the reader 104.

What is needed is a system and method for detecting and/or preventing such relay attacks between a key holder device and a reader.

SUMMARY

This document describes an NFC anti-relay detection and protection system and method.

In some aspects, a method of preventing a relay attack in a channel on which a near field communication (NFC) action between a key holder device and a reader is attempted is described. In some implementations, the method can include generating, by the reader, a reader random value, and sending, by the reader to the key holder device, the reader random value. The sending includes a time limit for a response from the key holder device, and the response includes a device random value and the reader random value. The method further includes receiving, by the reader, the response from the key holder device, the key holder device storing the reader random value and the device random value. The method further includes determining, by the reader, whether the response from the key holder device is received within the time limit for the response. If the response is received within the time limit, the method includes comparing, by the reader, the reader random value received from the key holder device with the reader random value sent by the reader. If the reader random value received from the key holder device matches the reader random value sent by the reader, the method includes executing, by the reader, the NFC action requested by the key holder device, and otherwise not executing the NFC action requested by the key holder device.

In other aspects, a method of detecting a relay attack in a channel on which a near field communication (NFC) action between a key holder device and a reader is attempted is described. The method includes establishing a time limit for polling communications between the key holder device and the reader, and generating, by each of the reader and the key holder device, a reader random value and a device random value respectively. The method further includes sending, by the reader to the key holder device, the reader random value, the sending including the time limit for a response from the key holder device, and the response includes the device random value and the reader random value. The method further includes receiving, by the reader, the response from the key holder device, and determining, by the reader, whether the response from the key holder device is received within the time limit for the response.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to an NFC anti-relay protection system and method, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

DETAILED DESCRIPTION

This document describes an NFC anti-relay protection system and method between a key holder device (i.e., "device") and an NFC reader device (i.e., "reader"). In accordance with implementations described herein, the system requires no NFC controller chip or reader chip hardware change, although the system can accommodate cases where faster relays are needed, and hardware, firmware and/or software changes are required. The system and method can detect relay delays of 1 ms or lower per command/response (where conventional estimation is a relay roundtrip of 1 ms with sophisticated equipment).

The system allows the reader to work with cards/devices that implement the relay protection and is configured for backward compatibility with devices that do not implement the relay protection described below. The system is also generic enough to cover most or all application domains (car key, company access, hospitality, transit, payment, etc.), and can adapted to be added to the NFC standard for wide acceptance. As such, the system works with ISO 14443 type A ("type A"), ISO 14443 type B ("type B"), with type F/Felica ("Felica"), and other standards.

The following methods and systems are described in the context of applicability for type A, but can also apply to type B, as well as to Felica with some adaptation.

The attacker device interacting with the vehicle only relays communication on the application level to the target device (via the second attacker device acting as a reader to the target device). NFC lower-level protocol establishment and execution is still done with the attacker device. Type A protocol timing requirements are very stringent, so that a relay is not possible. If the relay protection is able to distinguish the attacker device from the target device on this level, then relay can be detected/inhibited.

The reader generally creates an application-specific secure channel with the target device, which cannot be broken by the relay attacker. The security of this channel is considered as strong. It is assumed that specific anti-relay measurements (timing, random challenges, etc.) taken by the key holder device can be transferred from the target device to the reader by using this secure channel, which is considered as secure even under relay attack.

Unknown polling commands are ignored by cards/devices, per expected standard behavior of deployed cards. However, cards and devices that support the anti-relay protection described herein are configured to respond to those polling commands. Therefore, co-existence between legacy devices and anti-relay protected devices is possible without issues. A failing SELECT AID command does not break a transaction, as all cards/devices tolerate a reader selecting all supported applications in a row. Therefore, co-existence between legacy devices and anti-relay protected devices is possible without any disturbance. This behavior has been shown in deployed NFC systems.

Figure 2:
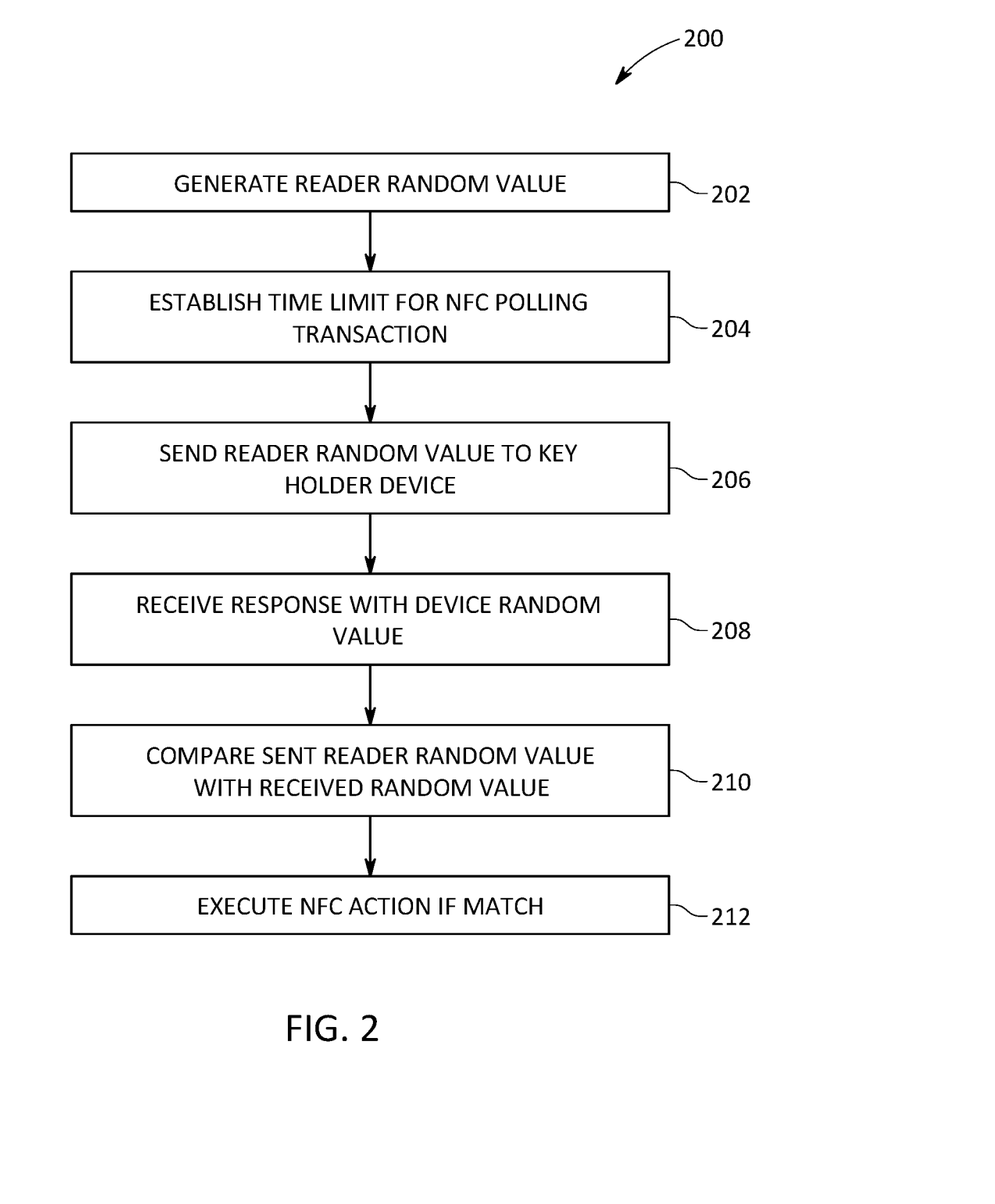
FIG. 2 is a flowchart of a method of anti-relay protection in a NFC session.

FIG. 2 is a flowchart of a method 200. At 202, a reader random value is generated. This can be generated by software or firmware that controls the reader. At 204, a time limit is established, primarily for NFC polling transaction(s), for instance, polling by the key holder device to the reader to set up an NFC action like unlocking a vehicle using a key fob. At 206, the reader random value is sent to the key holder device, and at 208, a response from the key holder device is received by the reader, where the response includes at least the reader random value. The response can also include a device random value generated by the key holder device or external controller. At 210, if the response is received within the established time limit (during which an attack cannot take place), the reader random value that is received at the reader is compared with the reader random value that was sent at 206. If there is a match, then the NFC action is executed, and the random values are stored by both the key holder device and the reader.

Figure 3:
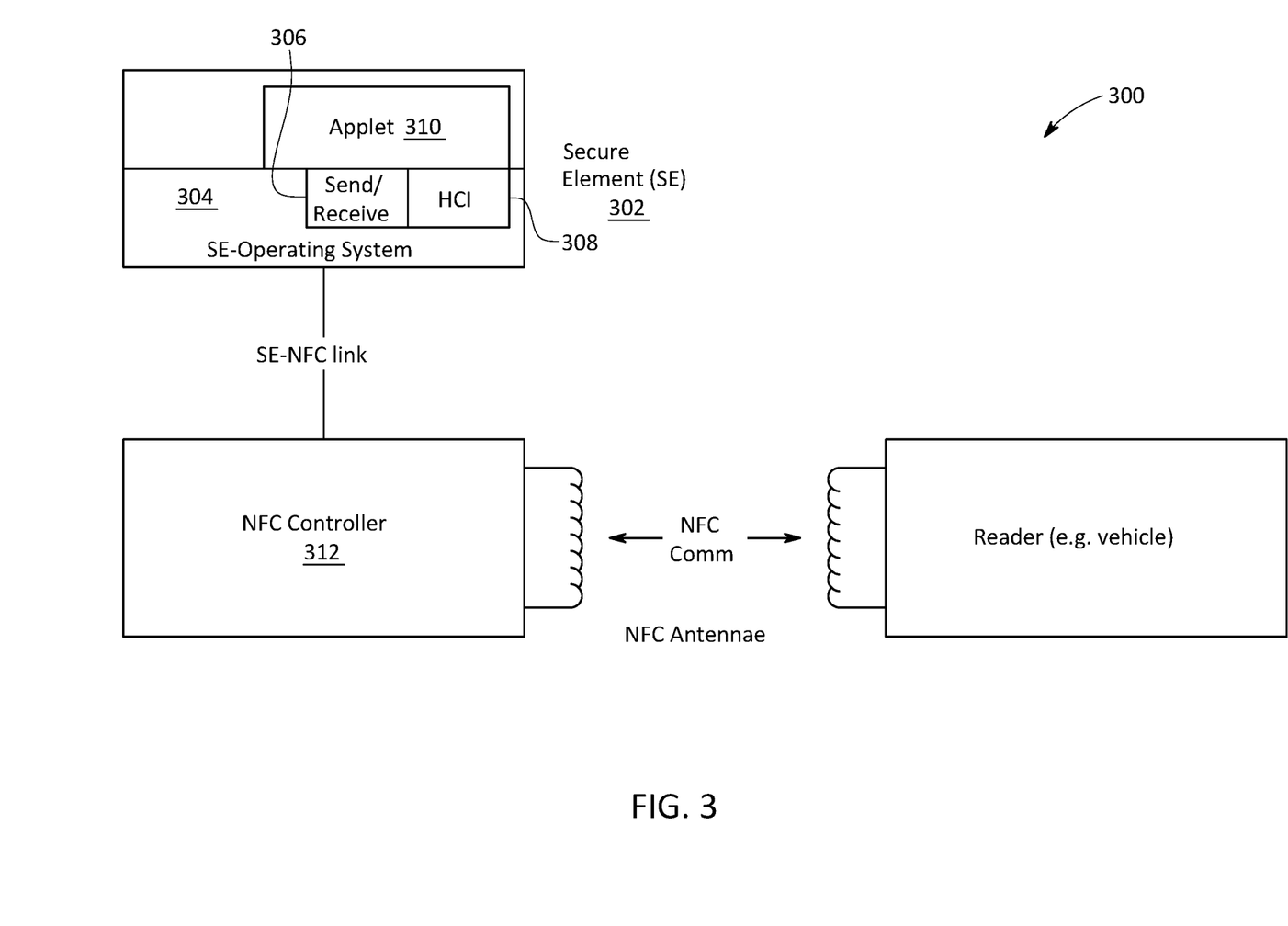
FIG. 3 is a block diagram of an NFC architecture configured to implement the method illustrated in FIG. 2.

FIG. 3 depicts an NFC system 300, with the following features. Secure element (SE) 302 is a secure processor having an operating system 304 (e.g. JavaCard) and an applet 310. The SE 302 exposes a send/receive API 306 and an HCI interface 308 to the applet 310. The applet 310 communicates for the transaction ("Secure Channel") via the send/receive API 306. Before the transaction starts, ChkDataD must be transferred from NFC controller 312 to the applet 310 in the SE 302. The NFC controller (NFCC) 312 stores the ChkData on device side, and the applet retrieves the ChkData from the NFCC 312.

The system 300 can execute several options to retrieve the ChkData from the NFCC 312: in a first option, the NFCC 312 sends an HCI event to the device host (AP). The device host uses an applet-specific command (i.e., EXCHANGE for car keys, PUT DATA for SEOS, etc.) to store ChkDataD into the appropriate data storage in the applet. The NFCC 312 sends a direct command to the SE OS 304, which uses any available method to store ChkData in the applet 310. Next, the NFCC 312 sends a command (via NCI, for example) to a helper applet on the SE 302. The helper applet (such as Mifare®, SEOS, etc.) fetches ChkDataD at an appropriate moment, e.g. when the data is required. The NFCC 312 can use the HCI service CLT_SUPPORT for type A and B in ETSI TS. Once the SELECT phase is over, the secure transaction starts. Accordingly, all NFC transactions that are to be protected against relay attacks set up a secure channel between the reader and the device, or transfer encrypted or signed (or both) data from the device to the reader.

In accordance with preferred implementations of the subject matter described herein, a system executes the following method. The reader sends a command containing a reader random value r to the device. The device responds within a very short time interval that does not allow a relay roundtrip with a response containing a device random s. This interval is enforced by the reader. The device stores both random values, r' (received) and s (sent) from this exchange. The reader also stores both random values r (sent) and s' (received) obtained during this exchange, if the device has responded within the time limit. Otherwise, the reader voids the random values r and s' (if obtained) and does not store them. The device uses any appropriate secure channel initiated during the transaction to transmit device r' and s to the reader. The reader compares the received device r' and s to the reader r and s'. If r=r' and s=s', then no relay has occurred. In all other cases a relay occurs, and the reader cannot execute the action (e.g. unlock the door, start the engine) despite the actual transaction (e.g. standard transaction for car keys) being successful. Alternatively, the reader uses r and s' in the key derivation scheme for the secure channel keys, and the device uses r' and s for the same key derivation. If r=r' and s=s', then no relay has occurred, and the applicative transaction will succeed. In all other cases the secure channel cannot be established, and the transaction will fail.

In accordance with specific exemplary implementations, a system can execute the following method: introduce a CHKA/ATCHKA polling command to exchange the random challenges, which works for type A. In other implementations, a SELECT AID command with a RID is introduced and used for anti-relay and a random PIX value. This works for both types A and B. This is the preferred solution as it is simple to implement. In still yet other implementations, a CHKB/ATCHKB polling command is introduced. This is optimized for type B and corresponds to such applications as the Apple Enhanced Contactless Polling feature proposed as part of the ISO14443-3 standard. A specific SLOT MARKER coding and a specific coding for ATQB for type B can further be introduced. This is also optimized for type B. The time slot option can be repurposed for type A, or merged with another feature disclosed herein.

Solution 1

Figure 4:
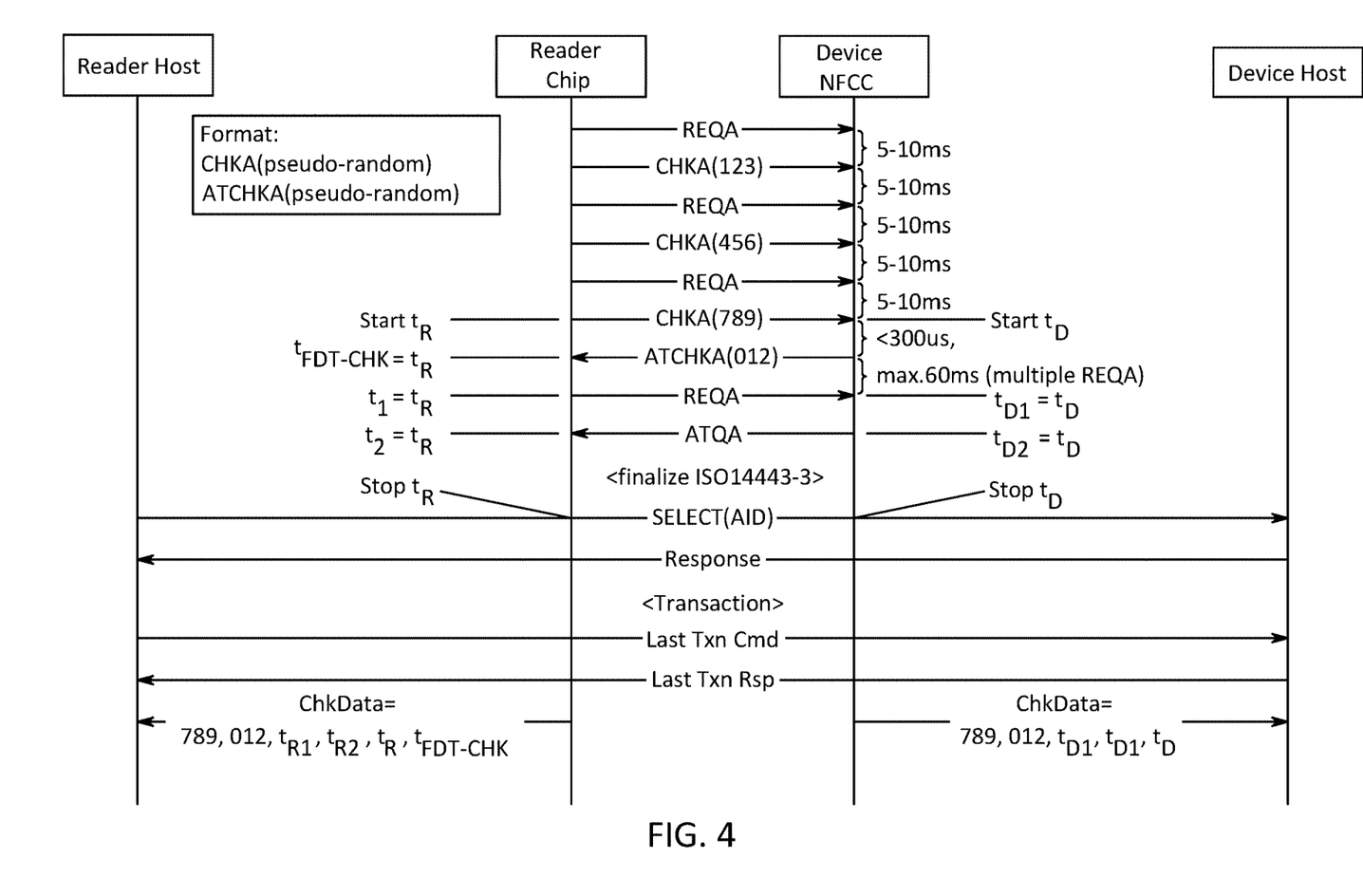
FIG. 4 illustrates a timing diagram of transactions between a reader host, a reader chip, an NFC device and a device host.

Regarding introducing the CHKA/ATCHKA polling commands to exchange the random challenges, and in reference to FIG. 4, a pseudo-random CHKA command can be defined similarly to a REQA command, which can be a 1 byte value, not yet used in the ISO14443-3 standard for polling. A 4 byte random value can be added, so the total length can be 5 bytes. An ATCHKA frame can be coded as 4 bytes representing the random value generated by the card. As a consequence, the anti-collision feature would not work anymore and only one card could be presented to the reader at a time, otherwise the system would not work. Note that in real-world implementations, anti-collision is rarely used, since in an RF situation it is difficult to power two or more cards reliably by the reader field without one shielding the other. The ATCHKA frame format should not follow the ATQA coding in ISO14443-3 with an additional 4 byte random value, because the transmission of the random value to the reader could be delayed due to the anti-collision loop. An attacker could bring multiple cards into the field, all with an UID being stronger than the real device's UID, so that the real device's response frame would be transmitted last. That might gain enough time for a relay attack roundtrip.

As illustrated in FIG. 4, the reader device alternates REQA and CHKA polling to allow a card not supporting the anti-relay feature to immediately respond to REQA. Cards supporting the anti-relay feature would first respond to CHKA. The reader enforces a very short response time (here <300 microseconds), otherwise it would not accept the response to the CHKA polling anymore, or it might correspond with a later CHKA polling, which would present the same scenario as a relay attack scenario. The reader shall enforce either an overall transaction time (from receiving the ATCHKA response frame at time tFDT-CHK to the last received transaction response, Last Txn Rsp) or a time between the response to ATCHKA and ATQA (t2−tFDT-CHK).

After the transaction has ended, both sides can store the ChkData values, which, at minimum, can include: a) for the reader, the random value sent in the CHKA frame that has received a response and the random value of the ATCHKA frame received by the device; and b) for the device the random value received in the CHKA frame and the random value of the ATCHKA response sent to the reader. The integration of this solution into existing applications or features, such as Apple Pay, Express Mode and Field Detect, may be difficult on the NFCC level, but reader chips might require a hardware change to be able to implement this.

Solution 2

Figure 5:
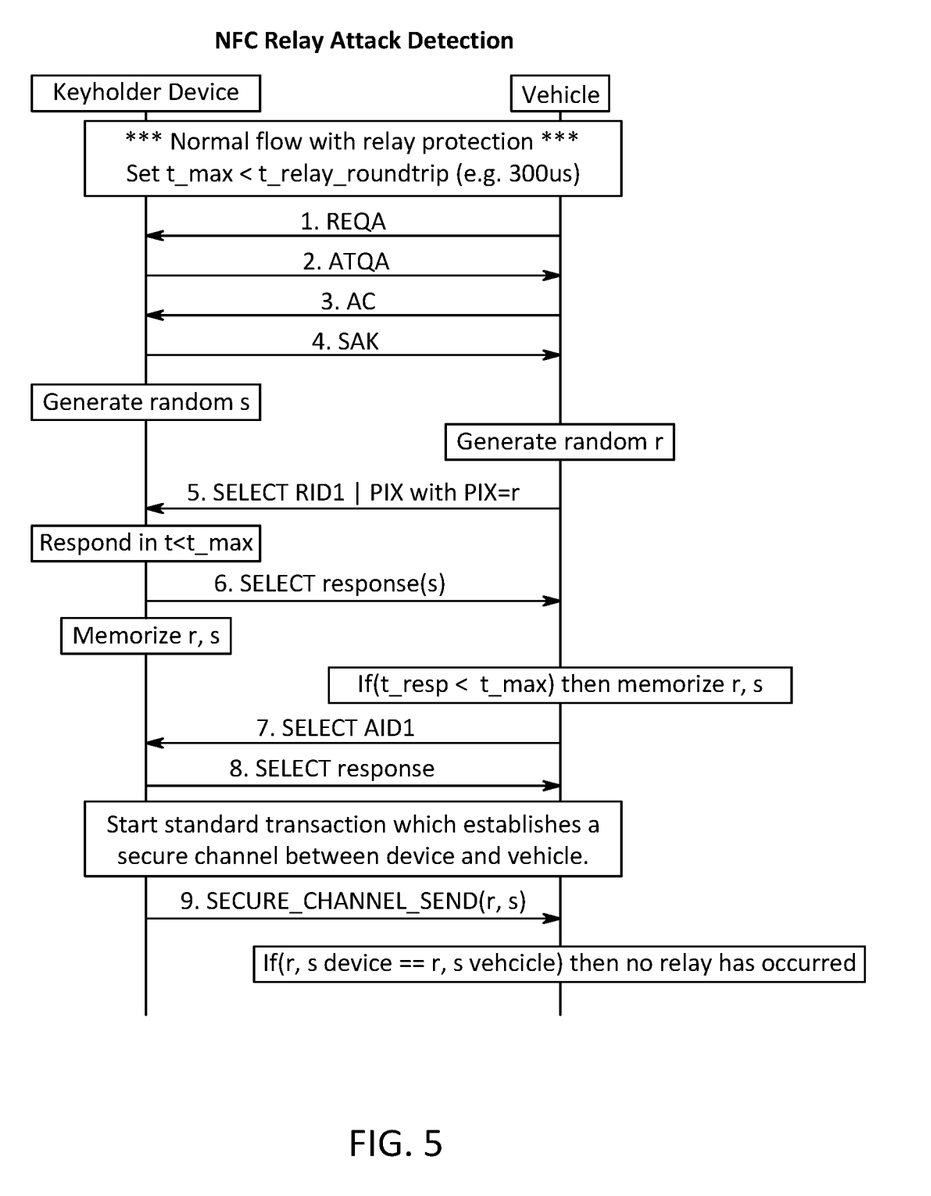
FIG. 5 illustrates one example of NFC relay attack detection.

To remove issues encountered with above-described approach, an alternative approach is described, as illustrated in FIG. 5. One main requirement is coexistence with non-supporting solutions on the same reader. This requires that either the anti-relay measure occurs before the actual standard NFC protocol starts (as shown in FIG. 4), or during the protocol, in all cases without failing the transaction for non-supporting cards. The only identified command for type A and B where a failure does not break the ongoing transaction is the SELECT AID command. All existing ISO14443-4 compliant cards and devices containing an application (applet) identified by AID1 can support the following reader behavior (as per ISO14443-3 and ISO 14443-4):

REQA—ATQA
Anti-Collision sequence (see ISO14443-3)
SELECT AID2—6A82 (file not found)
SELECT AID—9000 (valid select response)
First transaction command (e.g., AUTH0 for CCC car keys)

In some implementations, readers might support different cards for different applications (such as Mifare+proprietary transit card). Those applications are identified by different AIDs. Each card tolerates that the reader tries to select all supported applications until it selects the one supported by the presented card/device. This tolerant behavior is exploited by the idea of using the AID and its specific composition to implement the above-described exchange of random values. AID2 can be used to implement the relay detection as described hereafter. AID1 is the AID selecting the application that needs to be protected (e.g., car key, transit, Visa, Mastercard, etc.).

Every AID is composed of a registered identifier (RID) and a proprietary extension (PIX) both as per ISO7816-5. In the current proposition those elements can be used as follows as anti-relay AID:

The RID (5 bytes) shall be a well-defined value, possibly registered for anti-relay detection purpose or other entity or standards body (RID1).

The PIX (up to 11 bytes) contains the random value generated by the reader for each transaction (RND). It might contain a prefix to avoid that the random value matches other AID values for the same RID1.

Requirements are that the SELECT RID1|PIX command is detected and processed in the NFC controller and not relayed to the secure element. One implementation challenge is to filter the varying PIX values and accept the whole range of AIDs with the same RID1 in the NFCC. Therefore, also the prefix of the PIX could be helpful, so that RID1 Prefix-part of PIX (e.g., 2 bytes) is unique and filtering can be limited to this part of the AID. The reader can select RID1|PIX before selecting the correct application AID1, as follows:

- send the SELECT RID1|PIX command as first of the two commands after NFC protocol establishment, before the SELECT AID1 command is sent. Other SELECT commands can come before SELECT RID1|PIX or after SELECT AID1. They could also be sent between the two.
- send a different value for PIX each time the SELECT RID1|PIX command is sent (random or pseudo-random).
- send a PIX with a length of 4 bytes (for example) to prevent guessing attacks.
- measure the response time for the device to respond to the SELECT RID1|PIX command.
- accept a valid response (as defined below) as well as a failure to select the application (e.g. 6A82, application not present, i.e. the device does not support the anti-relay feature).
- register the device random s from the SELECT response on reader side: ChkDataR=r (PIX, sent), s (received).
- send the SELECT AID command immediately after receiving the SELECT RID1|PIX response.
- invalidate ChkDataR when the response to the SELECT AID command does not contain 9000 (success).

The NFCC responds as fast as possible to the SELECT RID1|PIX command. In some implementations, the NFCC:

- respond in less than 300 ms (or faster, to be evaluated);
- register the PIX on device side: ChkDataD=r (received), s (sent);
- respond with the device-side random value s in the SELECT response; and
- invalidate ChkDataD when RF off, DESELECT or any transaction error occurs.

The SELECT response can have the format of a 4 byte device_random|9000.

Attack Scenarios

Figure 6:
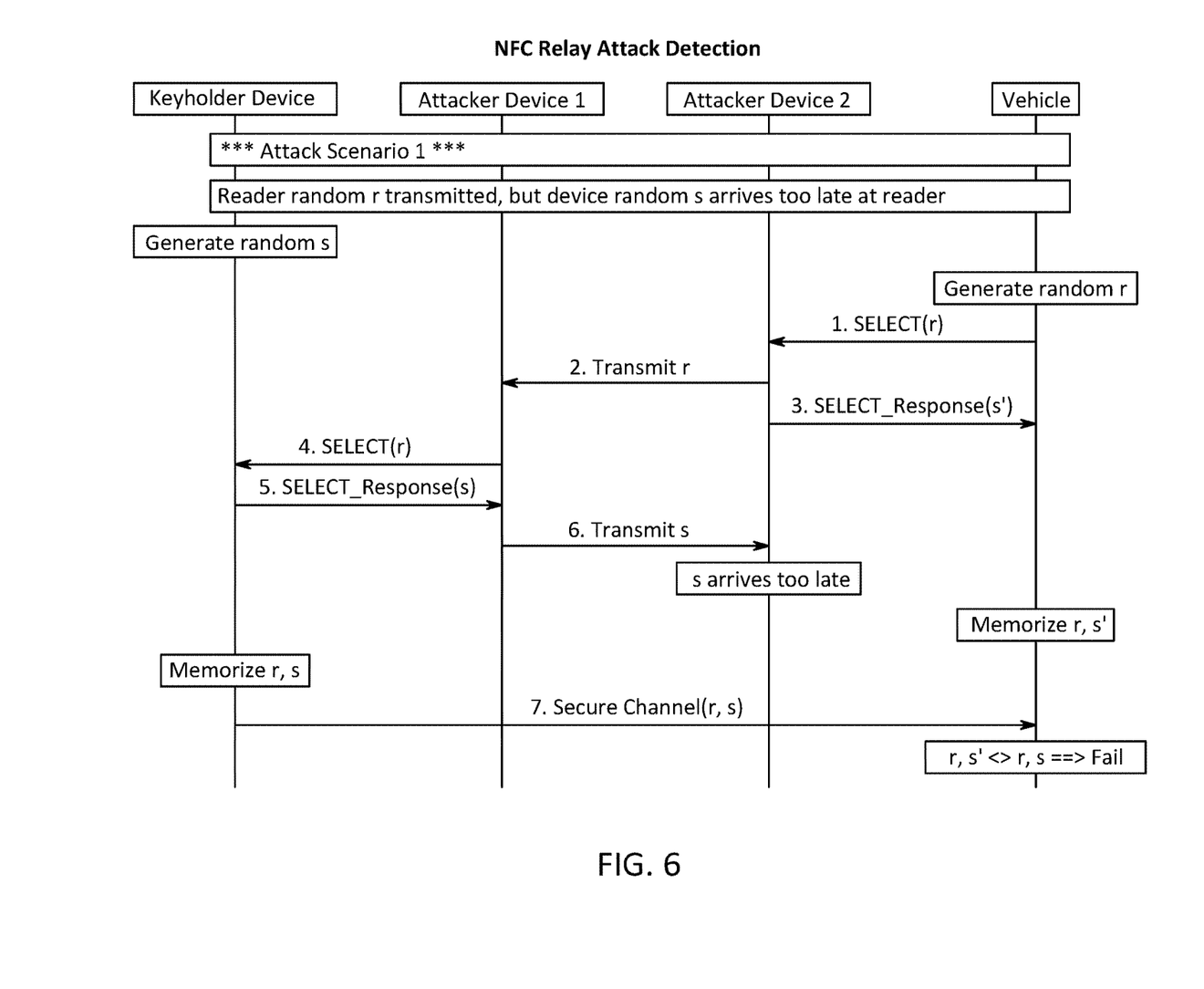
FIGS. 6-9 are timing diagrams to illustrate various attack scenarios and responses consistent with alternative implementations of the subject matter described herein; and When practical, similar reference numbers denote similar structures, features, or elements.
Figure 7:
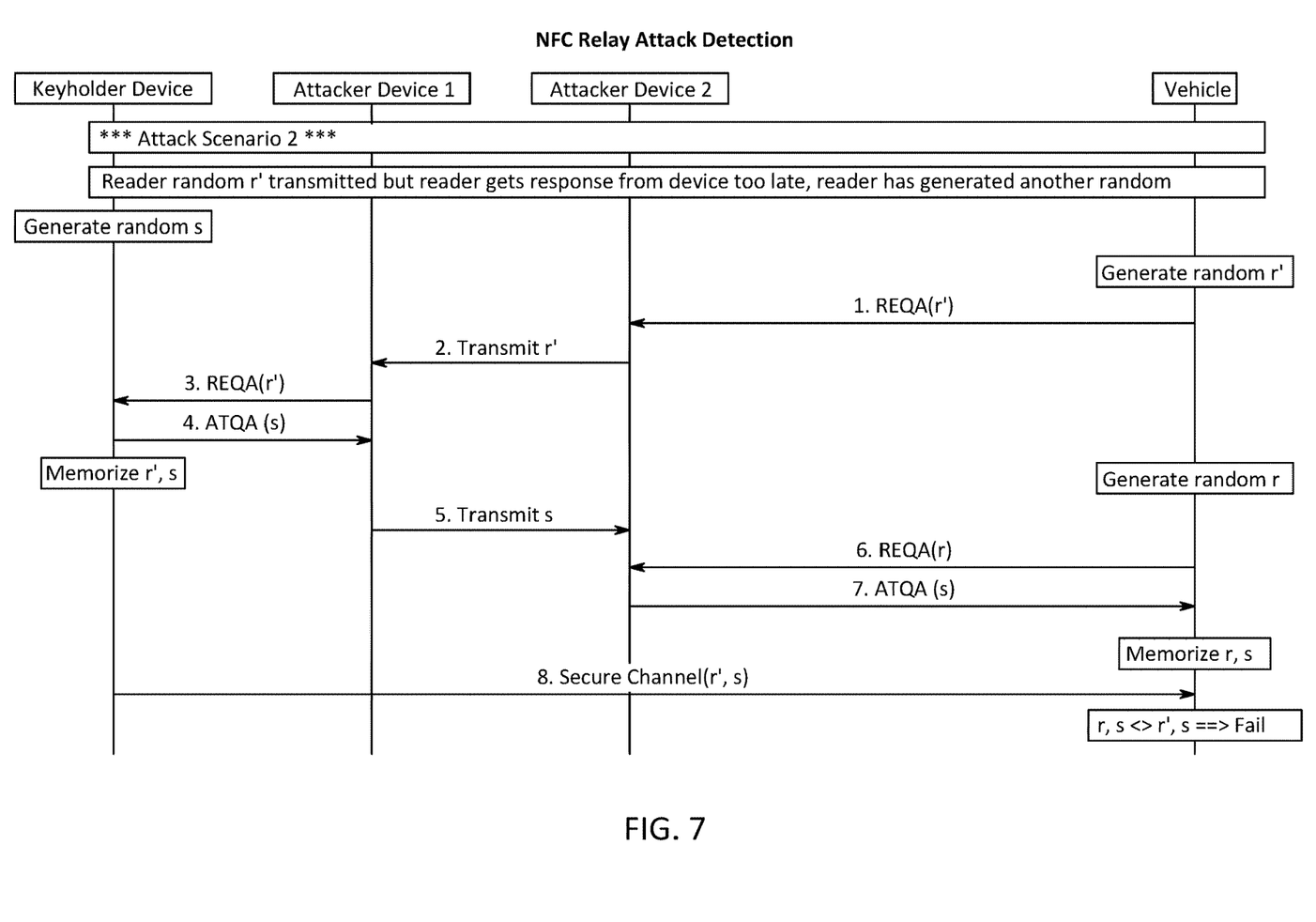
Figure 8:
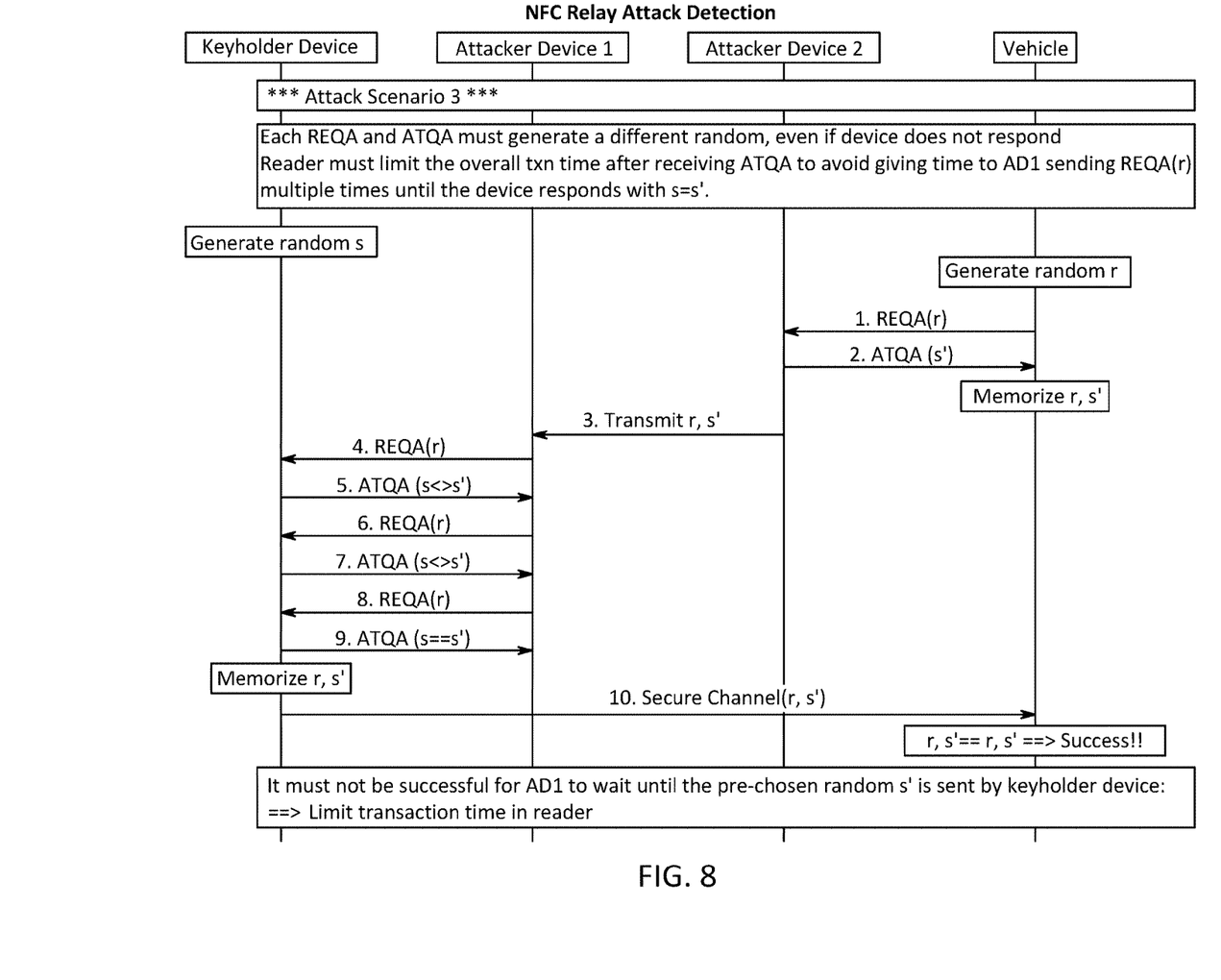
Figure 9:
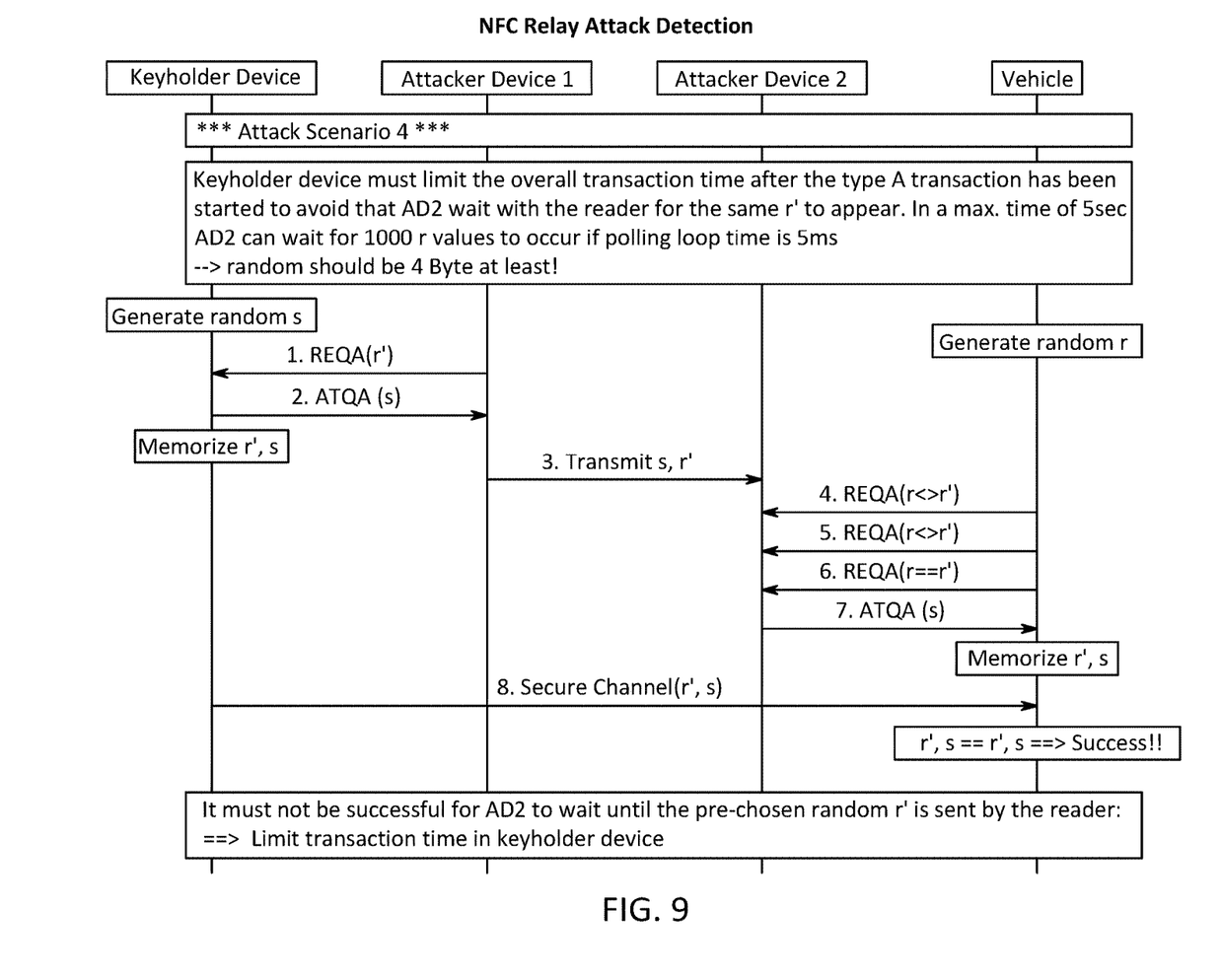

Attacks are prevented by enforcing a response time limit for device which can be shorter than the achievable relay roundtrip time. The device must respond within a specific time window. This prevents a roundtrip relay attack, which would take too long to provide the correct r to the device and the correct s to the reader. FIGS. 6-8 show different attack scenarios and describe how those attacks can be prevented.

FIG. 6 shows how the time limit is forcing the attacker device 2 to wait for random r until a transaction can be done by attacker device 1 with the key holder device to obtain device random s, which is then transmitted too late to the reader. In this example the anti-relay protection is enforced by the vehicle (reader) by requiring a fast response to the SELECT(r) command. REQA, ATQA, etc. which precede the SELECT command are not depicted here.

FIG. 7 shows how the time limit forces the attacker that waits for the correct key holder device random s to respond to another polling which has produced a different random value r, whereas the earlier random value r' has been presented to the key holder device. The reader can limit the overall transaction time (REQA to Secure Channel exchange) bound to a specific reader random r in order to avoid that waiting for a device to produce the same random value as the one used by the attacker device with the reader, as shown in FIG. 6.

FIG. 8 illustrates how the device shall limit the transaction time bound to a specific device random s in order to avoid that waiting for the reader to produce the same random value as the one used by the attacker device with the key holder device.

In alternative implementations, for the solutions illustrated in FIGS. 4 and 5, the flows remain unchanged, but the solution shown in FIG. 4, REQA can be replaced by CHKA and ATQA replaced by ATCHKA. For the solution shown in FIG. 5, REQA can be replaced by SELECT command and ATQA replaced by SELECT response. However, two attack scenario MSDs can be produced to match exactly the solutions shown in FIGS. 4 and 5.

Transferring ChkDataD to the Reader

The ChkDataD values registered by the device during the SELECT phase can be transferred to the reader using mechanisms or processes described herein. This is a way to piggyback on the transfer using application-specific transfer security. For instance, this can be leveraged for all Mifare® variants, HID SEOS, payment applets, the Apple® Hydra transaction and the Apple® car key transaction (now standardized in CCC), as examples.

In order to transfer ChkDataD to the reader for e.g., automotive purpose, the car key applet could provide, as a preferred option, ChkDataD via an (encrypted and mac'ed) EXCHANGE command/response (as per CCC specification R2 v1.0.7a) to the reader. A specific EXCHANGE command code (e.g., 0x8F) can be specified for this purpose. The applet has either pre-fetched the data from the CLF or has retrieved them (e.g., via the CLT_SUPPORT gate as described above) when the EXCHANGE command has been received.

As the reader does not need to know the exact ChkData values the card has registered, but only if they are the same or not, a more elegant way to compare ChkDataR and ChkDataD can be proposed: Reader and device mix their registered ChkData values into the key derivation scheme for the transaction secure channel for the applicative data exchange. If ChkDataR < >ChkDataD, then the secure channel would not work as both sides would not use the same keys. This model will likely be proposed for the anti-relay feature deployment for car keys. It could also be added to other applet schemes, such as Mifare DESFire.

In other implementations, the data can be provided via a private mailbox. Note that while the private mailbox can be an automotive CCC standard construct that might not exist for other use cases, the private mailbox allows for the car and the device to exchange data via a secure channel. This can be done by creating a specific section for the ChkDataD, or by adding it to another existing section. The signaling mechanism can then be used to signal the presence of the data. The reader can erase it after reading and resetting the signaling bit.

In all cases, the reader side compares ChkDataD to ChkDataR (i.e., r, s from the device to r, s from the reader)

after reception. Then, the reader not only has a positive outcome from the applicative transaction (e.g., successful device signature verification of standard transaction to start the car engine), but also sees matching ChkData values. Only if both applicative transaction and ChkData comparisons are successful, the engine should be started. If ChkData values are not matching, then a relay has occurred.

Other options include storing ChkDataD in a dedicated Mifare block, in which the reader reads the block with appropriate security during the transaction (e.g. transit terminal); and storing ChkData in a common data object or ADF of HID SEOS and retrieve it using the GET DATA command. These variants of a method of exchanging the random values r and s to obtain ChkDataD can be implemented in the NFC controller of the device.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs) used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

As described above, one aspect of the present technology is the gathering and use of data available from specific and legitimate sources to improve the delivery to users of invitational content or any other content that may be of interest to them. The present disclosure contemplates that in some instances, this gathered data may include personal information data that uniquely identifies or can be used to identify a specific person. Such personal information data can include demographic data, location-based data, online identifiers, telephone numbers, email addresses, home addresses, data or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, the personal information data can be used to deliver targeted content that may be of greater interest to the user in accordance with their preferences. Accordingly, use of such personal information data enables users to have greater control of the delivered content. Further, other uses for personal information data that benefit the user are also contemplated by the present disclosure. For instance, health and fitness data may be used, in accordance with the user's preferences to provide insights into their general wellness, or may be used as positive feedback to individuals using technology to pursue wellness goals.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominent and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations that may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, such as in the case of advertisement delivery services, the present technology can be configured to allow users to select to "opt in" or "opt out" of participation in the collection of personal information data during registration for services or anytime thereafter. In another example, users can select not to provide mood-associated data for targeted content delivery services. In yet another example, users can select to limit the length of time mood-associated data is maintained or entirely block the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users based on aggregated non-personal information data or a bare minimum amount of personal information, such as the content being handled only on the user's device or other non-personal information available to the content delivery services.

What is claimed is:

1. A method of preventing relay attacks in a channel on which a near field communication (NFC) action between a key holder device and a reader is attempted, the method comprising:
   generating, by the reader, a reader random value;
   sending, by the reader to the key holder device, the reader random value, the sending including a time limit for a response from the key holder device, the response comprising a device random value and the reader random value;
   receiving, by the reader, the response from the key holder device;
   determining, by the reader, whether the response from the key holder device is received within the time limit;
   when the response is received within the time limit, comparing, by the reader, the reader random value received from the key holder device with the reader random value sent by the reader; and
   when the reader random value received from the key holder device matches the reader random value sent by the reader, executing, by the reader, the NFC action requested by the key holder device, and otherwise not executing the NFC action requested by the key holder device.

2. The method in accordance with claim 1, wherein the time limit is calculated based on a time to execute a relay attack by one or more attacking devices within the channel used for the NFC action.

3. The method in accordance with claim 1, further comprising storing, by the reader, the reader random value received from the key holder device with the reader random value sent by the reader when the response is received within the time limit.

4. The method in accordance with claim 1, wherein each of the reader random value and the device random value are included in respective polling commands configured to be sent by the reader and the key holder device to establish the channel.

5. The method in accordance with claim 1, further comprising establishing, by the reader, a secure channel with the key holder device on which to execute the NFC action.

6. The method in accordance with claim 5, wherein the NFC action includes the reader random value and the device random value.

7. The method in accordance with claim 1, wherein when the response is received after the time limit, terminating, by the reader, the NFC action with the key holder device.

8. The method in accordance with claim 1, further comprising discarding, by the reader, the reader random value received from the key holder device when the response is received after the time limit.

9. A method of detecting relay attacks in a channel on which a near field communication (NFC) action between a key holder device and a reader is attempted, the method comprising:
    establishing a time limit for polling communications between the key holder device and the reader;
    generating, by each of the reader, a reader random value;
    generating, by the key holder device, a device random value;
    sending, by the reader to the key holder device, the reader random value, wherein a response from the key holder device comprising the device random value and the reader random value must be received within the time limit;
    receiving, by the reader, the response from the key holder device; and
    determining, by the reader, whether the response from the key holder device is received within the time limit.

10. The method in accordance with claim 9, wherein when the response is received after the time limit, terminating, by the reader, the NFC action with the key holder device.

11. The method in accordance with claim 9, wherein the time limit is calculated based on a time to execute a relay attack by one or more attacking devices within the channel used for the NFC action.

12. The method in accordance with claim 9, further comprising storing, by the key holder device, the reader random value and the device random value prior to sending the response.

13. The method in accordance with claim 9, further comprising discarding, by the reader, the reader random value received from the key holder device when the response is received after the time limit.

14. The method in accordance with claim 9, wherein each of the reader random value and the device random value are included in respective polling commands configured to be sent by the reader and the key holder device to establish the channel.

15. The method in accordance with claim 9, further comprising establishing, by the reader, a secure channel with the key holder device on which to execute the NFC action.

16. A reader for detecting relay attacks in a channel on which a near field communication (NFC) action between a key holder device and the reader is attempted, the reader comprising:
    a programmable processor; and
    a non-transitory machine-readable medium storing instructions that, when executed by the programmable processor, cause the programmable processor to:
        establish a time limit for polling communications between the key holder device and the reader;
        generate, by the reader, a reader random value;
        send, by the reader to the key holder device, the reader random value, the sending indicating the time limit for a response from the key holder device, the response comprising a device random value and the reader random value;
        receive, by the reader, the response from the key holder device; and
        determine, by the reader, whether the response from the key holder device is received within the time limit for the response.

17. The reader in accordance with claim 16, wherein when the response is received after the time limit, the instructions cause the programmable processor to terminate, by the reader, the NFC action with the key holder device.

18. The reader in accordance with claim 16, wherein the time limit is calculated based on a time to execute a relay attack by one or more attacking devices within the channel used for the NFC action.

19. The reader in accordance with claim 16, further comprising instructions to cause the programmable processor to further comprising establishing a secure channel with the key holder device on which to execute the NFC action.

20. The reader in accordance with claim 16, further comprising instructions to cause the programmable processor to discard, by the reader, the reader random value received from the key holder device with the reader random value sent by the reader when the response is received after the time limit.

* * * * *

UNITED STATES PATENT AND TRADEMARK OFFICE
CERTIFICATE OF CORRECTION

| | |
|---|---|
| PATENT NO. | : 12,389,227 B2 |
| APPLICATION NO. | : 17/952186 |
| DATED | : August 12, 2025 |
| INVENTOR(S) | : Matthias Lerch, Florian Galdo and Gordon Y. Scott |

Page 1 of 1

It is certified that error appears in the above-identified patent and that said Letters Patent is hereby corrected as shown below:

In the Claims

Column 13, Line 23, Claim 9: please delete "each of".

Signed and Sealed this
Twenty-third Day of September, 2025

John A. Squires
*Director of the United States Patent and Trademark Office*